(12) United States Patent
Herwono et al.

(10) Patent No.: US 9,836,600 B2
(45) Date of Patent: Dec. 5, 2017

(54) METHOD AND APPARATUS FOR DETECTING A MULTI-STAGE EVENT

(71) Applicant: BRITISH TELECOMMUNICATIONS PUBLIC LIMITED COMPANY, London (GB)

(72) Inventors: Ian Herwono, London (GB); Zhan Cui, London (GB)

(73) Assignee: British Telecommunications PLC, London (GB)

( * ) Notice: Subject to any disclaimer, the term of this patent is extended or adjusted under 35 U.S.C. 154(b) by 0 days.

(21) Appl. No.: 14/781,163

(22) PCT Filed: Mar. 31, 2014

(86) PCT No.: PCT/GB2014/000129
§ 371 (c)(1),
(2) Date: Sep. 29, 2015

(87) PCT Pub. No.: WO2014/155051
PCT Pub. Date: Oct. 2, 2014

(65) Prior Publication Data
US 2016/0055334 A1    Feb. 25, 2016

(30) Foreign Application Priority Data
Mar. 29, 2013  (EP) ..................................... 13250051

(51) Int. Cl.
*G06F 11/00*  (2006.01)
*G06F 21/55*  (2013.01)
*H04L 29/06*  (2006.01)

(52) U.S. Cl.
CPC ........ *G06F 21/554* (2013.01); *H04L 63/1416* (2013.01); *H04L 63/1458* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 5,465,321 A | 11/1995 | Smyth | |
| 7,058,821 B1 * | 6/2006 | Parekh | ................. H04L 63/145 713/194 |

(Continued)

FOREIGN PATENT DOCUMENTS

| | | |
|---|---|---|
| EP | 2 009 865 | 12/2008 |
| EP | 1 905 197 | 9/2012 |

OTHER PUBLICATIONS

Ali Ebrahimi et al., Automatic attack scenario discovering based on a new alert correlation method, Systems Conference (SYSCON), 2011 IEEE International, IEEE, Apr. 4, 2011 (Apr. 4, 2011), pp. 52-58.*

(Continued)

*Primary Examiner* — Lisa Lewis
*Assistant Examiner* — Olanrewaju Bucknor
(74) *Attorney, Agent, or Firm* — Nixon & Vanderhye PC

(57) ABSTRACT

A multi-stage event detector for monitoring a system, the multi-stage event detector including: a process generator operable to generate main and sub-processes, each main and sub-process being operable to generate and initiate a detection agent each of which is operable to be triggered by detecting the occurrence of a trigger event and to report back to its generating process or sub-process upon being so triggered. Each process or sub-process is operable to respond to receipt of a report from a triggered detection agent by reporting the detection of a multi-stage event to an overall controller.

19 Claims, 7 Drawing Sheets

(56) References Cited

U.S. PATENT DOCUMENTS

| | | | |
|---|---|---|---|
| 7,076,803 B2* | 7/2006 | Bruton | H04L 63/1408 713/164 |
| 8,424,072 B2 | 4/2013 | Pullikottil | |
| 2002/0059078 A1* | 5/2002 | Valdes | H04L 41/0631 705/1.1 |
| 2004/0098623 A1* | 5/2004 | Scheidell | G06F 21/552 726/23 |
| 2004/0123141 A1* | 6/2004 | Yadav | H04L 63/1416 726/23 |
| 2006/0085854 A1* | 4/2006 | Agrawal | G06F 21/552 726/23 |
| 2006/0253906 A1* | 11/2006 | Rubin | H04L 63/1416 726/23 |
| 2007/0094722 A1* | 4/2007 | Riordan | H04L 63/1416 726/23 |
| 2007/0150427 A1 | 6/2007 | Geib | |
| 2007/0226164 A1 | 9/2007 | Geib | |
| 2008/0040801 A1 | 2/2008 | Buriano et al. | |
| 2008/0209517 A1 | 8/2008 | Nightingale et al. | |
| 2009/0064333 A1 | 3/2009 | Saurabh | |
| 2009/0199296 A1* | 8/2009 | Xie | G06F 21/316 726/23 |
| 2010/0162400 A1 | 6/2010 | Feeney | |
| 2011/0264608 A1 | 10/2011 | Gonsalves | |
| 2012/0102570 A1 | 4/2012 | Herz | |
| 2012/0278890 A1 | 11/2012 | Maatta | |
| 2012/0329426 A1 | 12/2012 | Kario et al. | |
| 2014/0020100 A1* | 1/2014 | Sharma | G06F 21/552 726/23 |
| 2015/0020199 A1* | 1/2015 | Neil | H04L 63/1433 726/23 |
| 2016/0055335 A1 | 2/2016 | Herwono et al. | |

OTHER PUBLICATIONS

Robert J Cole et al., Addressing Low Base Rates in Intrusion Detection via Uncertainty-Bounding Multi-Step Analysis, Computer Security Applications Conference, 2008. ACS AC 2008. Annual, IEEE, Piscataway, NJ, USA, Dec. 8, 2008 (Dec. 8, 2008), pp. 269-278.*

International Search Report for PCT/GB2014/000129, dated Jun. 26, 2014.

M. Ficco and L. Romano, "A Generic Intrusion Detection and Diagnoser System Based on Complex Event Processing," 2011 First International Conference on Data Compression, Communications and Processing, Palinuro, Jun. 2011, pp. 275-284—doi: 10.1109/CCP.2011.43.

D. h. Lee, D. y. Kim and J. i. Jung, "Multi-Stage Intrusion Detection System Using Hidden Markov Model Algorithm," 2008 International Conference on Information Science and Security (ICISS 2008), Seoul, Jan. 2008, pp. 72-77—doi: 10.1109/ICISS.2008.22.

D. Ourston, S. Matzner, W. Stump and B. Hopkins, "Applications of hidden Markov models to detecting multi-stage network attacks," 36th Annual Hawaii International Conference on System Sciences, Jan. 2003. Proceedings of the, 2003, pp. 10 pp.- doi: 10.1109/HICSS.2003.1174909.

A. Ebrahimi, A. H. Zad Navin, M. Kamal Mirnia, H. Bahrbegi and A. A. Alasti Ahrabi, "Automatic attack scenario discovering based on a new alert correlation method," 2011 IEEE International Systems Conference, Montreal, QC, Apr. 2011, pp. 52-58—doi: 10.1109/SYSCON.2011.5929072.

Ying-Mei Wang, Zeng-Liang Liu, Xiang-Yun Cheng and Ke-Jun Zhang, "An analysis approach for multi-stage network attacks," 2005 International Conference on Machine Learning and Cybernetics, Guangzhou, China, Aug. 2005, pp. 3949-3954 vol. 7.—doi: 10.1109/ICMLC.2005.1527628.

R. J. Cole and P. Liu, "Addressing Low Base Rates in Intrusion Detection via Uncertainty-Bounding Multi-Step Analysis," 2008 Annual Computer Security Applications Conference (ACSAC), Anaheim, CA, Dec. 2008, pp. 269-278—doi: 10.1109/ACSAC.2008.14.

Vladimir Gorodetski and Oleg Karsayev and Vladimir Samoilov, V.: Multi-agent Data Fusion Systems: Design and Implementation Issues, Proceedings of the 10th International Conference on Telecommunication Systems—Modeling and Analysis, as early as Jan. 2002, pp. 3-6. https://pdfs.semanticscholar.org/d2ea/8376ceccff2391089a190c90aab73a6324c5.pdf.

Kjetil Haslum, Ajith Abraham, and Svein Knapskog. Aug. 2007. DIPS: A Framework for Distributed Intrusion Prediction and Prevention Using Hidden Markov Models and Online Fuzzy Risk Assessment. In Proceedings of the Third International Symposium on Information Assurance and Security (IAS '07). IEEE Computer Society, Washington, DC, USA, 183-190. DOI=http://dx.doi.org/10.1109/IAS.2007.36.http://wsts05.softcomputing.net/ias07_1.pdf.

J. Kang, Q. Li, Y. Zhang and Z. Li, "An Improvement on Precision in DDoS Source-End Detection with Multi-stream Combined HMM," Dec. 2007 International Conference on Computational Intelligence and Security Workshops (CISW 2007), Harbin, 2007, pp. 514-517—doi: 10.1109/CISW.2007.4425546.

Xianfeng Song, Guangxi Chen and Xiaolong Li, "A Weak Hidden Markov Model based intrusion detection method for wireless sensor networks," 2010 International Conference on Intelligent Computing and Integrated Systems, Guilin, Dec. 2010, pp. 887-889. doi: 10.1109/ICISS.2010.5657049.

* cited by examiner

METHOD AND APPARATUS FOR DETECTING A MULTI-STAGE EVENT

This application is the U.S. national phase of International Application No. PCT/GB2014/000129 filed 31 Mar. 2014, which designated the U.S. and claims priority to EP Patent Application No. 13250051.3 filed 29 Mar. 2013, the entire contents of each of which are hereby incorporated by reference.

TECHNICAL FIELD

The present invention in certain example embodiments relates to a method and apparatus for determining system behavior from observed data, in particular for detecting a multi-stage event. Most particularly, the invention in certain example embodiments relates to a method and apparatus for detecting behavior such as a malicious cyber-attack on a computer network or sub-network of computer devices connected to the Internet, based on observations of the behavior of the devices of the network or sub-network or of traffic flowing over the network or sub-network, or of behavior of third party devices, such as third party social media web-sites, etc.

BACKGROUND AND SUMMARY

As so-called "cyber-attacks" (used here as a general term to cover such activities as denial of service (DOS), including Distributed Denial of Service (DDOS), attacks and attempts to infect target computer devices with malicious software—e.g. as part of a DOS attack or simply in order to steal information—e.g. credit card details of customers—etc.) increase in sophistication, they are becoming both more difficult to detect using a single detector and at the same time they are tending to appear more and more like multi-stage attacks, passing though several distinct stages which can be identified (as distinct stages) by skilled human security experts.

Thus, although there are known monitors for detecting known signatures of malicious traffic and/or activities at various different detectors associated with various different typical stages of a multi-stage cyber-attack, it is often difficult to detect a sophisticated multi-stage attack from the use of a single monitor alone (or even multiple different monitors acting in isolation). Instead, such sophisticated multi-stage attacks can often only successfully be detected by linking various different activities (generally detected by different detectors) together and examining them together as aspects of a single multi-stage attack.

For example, DDOS attacks often start with some bad Public relations (PR) of a particular target organization observed on news or social media websites, or with some new vulnerability of a target organization being made public. Then potential attackers may start to talk about the target and to exchange ideas for an attack and recruit or combine forces with other attackers. At some time after that, detection of worms carrying specific DOS payloads may be observed. Then scanning activities may be observed on target networks associated with the target organization, and/or specific HTTP request volumes may increase and compromised/infected machines loaded with DOS malware may be detected. Finally, attacks are launched from multiple machines both within and without the target organizations networks are launched at specific coordinated times in order to bring vital services associated with the target organization down.

As mentioned, such multi-stage attacks can often defeat individual point checks and can only be detected by linking and examining together the various different stages of the attack. For example, login failures are quite common and unlikely to result in a major security incident. However, login failures, followed by a successful login, and obtaining admin rights (by a malicious unauthorized user), and then installing (malicious) software and then observing abnormal traffic flowing over the network is very likely in total to be indicative of a successful attack.

Various approaches for either automatically or semi-automatically identifying attacks by looking for these distinct multiple stages of attack have been proposed and a selection of such proposals is set out below:

"Multi-stage Intrusion Detection System Using Hidden Markov Model (HMM) Algorithm" by Do-hyeon Lee, Doo-young Kim, Jae-il Jung (2008 International Conference on Information Science and Security) proposes a multi-stage Intrusion Detection System (IDS) architecture using an HMM Algorithm and presents a method for determining an intrusion/attack by estimation of the features appearing at each stage of an intrusion. The intrusion techniques used at each stage (e.g. to do network probing) are detected using "characteristic intrusion signals" (i.e. rule sets). Each attack stage has a detection agent which performs an independent detection function. It analyses the data collected from a network line to recognize signals that are known to be intrusions (using the rule sets). The signal sequences detected by the detection agents are then synthesized and the HMM algorithm is used to determine whether the synthesized detected sequences corresponds to an intrusion sequence. The method and system described in this paper aim to produce a better IDS which can correlate "local" alerts (i.e. intrusion signals) at different points in time in order to identify the eventual intrusion/attack objective. Each detection agent (for each stage) appears to be independent of each other detection agent; hence it doesn't have any information from the previous stage regarding certain attack target. Rather, correlation (e.g. if the same destination IP address is used) is performed only when the agents' detection signals are being synthesized. The system doesn't consider, for example, external factors such as discussions in social media, or a new vulnerability being announced.

"Applications of Hidden Markov Models to Detecting Multi-stage Network Attacks" by Ourston et al. (Proceedings of the 36th Hawaii International Conference on System Sciences—2003) describes an approach for detecting multi-stage attacks using Hidden Markov Models (HMMs) and compares the usefulness of the HMM approach to other machine learning techniques. The paper rather glosses over the exact manner in which visible state values are determined, presumably because whatever method is used to achieve this is the same for the different machine learning techniques being compared such that the comparison should still be valid whatever method is chosen. However, they do suggest using multiple detectors and pre-processing the outputs of the detectors, and they suggest using human experts to perform some mapping between alert types (e.g. a port probe) and intrusion category (e.g. initial recon). This mapping though appears to be between an observable value and a hidden state and so does not make clear the nature of the observable values presented to the HMM model. In any event, the main conclusion of the paper is that HMM's are well suited to the task of detecting multi-stage network attacks.

"Automatic attack scenario discovering based on a new alert correlation method" by Ali Ebrahimi et al (Systems Conference (SYSCON), 2011 IEEE International, IEEE, 4 Apr. 2011, pages 52-58) teaches a method of identifying a multi-stage attack. The method includes collecting multiple Intrusion Detection System (IDS) alerts and grouping them into a single group based on source port and within that overall group, sub-grouping the alerts, based on target IP address, into different sub-groups, and then attempting to allocate the alerts within each sub-group to further sub-groups which correspond to different stages of a multi-stage attack.

"Addressing Low Base Rates in Intrusion Detection via Uncertainty-Bounding Multi-Step Analysis" by Robert Cole and Peng Liu (Computer Security Applications Conference 2008 (ACSAC 2008) Annual, IEEE, Piscataway, N.J., USA, 8 Dec. 2008 pages 269-278) describes a system in which a user is given control to specify a trade-off between confidence that an attack is occurring (confidence) and how quickly an attack is detected (agility). The authors recognize that in general there will always be a trade-off between these two characteristics within a multi-stage attack detection system and that by giving control over where the balance should lie to a user they can tailor the system to their own needs (e.g. if a user has large human resources for analyzing possible attacks and a strong desire to catch attacks as quickly as possible they would tend to choose for a more agile system, whereas user's that can only afford relatively small amount of resource for investigating possible attacks would tend to prefer to receive fewer false positives and thus would tend to opt for a slower but more reliable system (with few false positives). In terms of a system for actually detecting multi-stage events, this paper described only a very simple system in which it was assumed that each detection by a sensor could be unambiguously associated with a particular stage of a particular multi-stage attack with a simple probability of being right or wrong. This is sufficient for the purposes of demonstrating their trade-off issues but, as was acknowledged by the authors, would not be useful for creating a practical multi-stage attack detection system which would thus need to borrow heavily from known prior art systems for correlating sensor outputs with multi-stage attacks.

"An analysis Approach for Multi-stage Network Attacks" describes a method of analyzing a system which is vulnerable to attack using a Multi-stage Finite State Machine Model. Using such a model, network administrators can identify optimum ways of improving the security of the system to prevent the occurrence of successful attacks. There is no teaching of detecting currently occurring multi-stage attacks, and so it does not describe a multi-stage event detector.

A difficulty faced by all systems attempting to detect multi-stage events occurring in relatively complex systems where more than one multi-stage event may be occurring within overlapping periods of time, is how to efficiently keep track of an individual multi-stage event occurring and not getting obfuscated by the detection of overlapping multi-stage events, and additionally how to deal efficiently with the possibility that in its early stages a multi-stage event may be indistinguishable (or difficult to distinguish) from other events with similar or identical starting behaviours, especially if different attacks are occurring from the same attacker/source of attack.

SUMMARY OF INVENTION

Preferably, the hidden state determiner includes a model of the system specifying a plurality of distinct hidden states (or states of interest) which the system can occupy (i.e. be in), a plurality of visible states, which can be determined (directly or indirectly) by the event detecting detector units, and a set of probabilities including at least a plurality of transition probabilities expressing the probability of the system transitioning from one hidden state to another and a plurality of production probabilities expressing the probability of a particular visible state being determined (or detected) by the event detecting detector units. Preferably the model is, in fact, a Hidden Markov Model (HMM) and most preferably a first order HMM. Preferably, the values for the various probability values contained within the model are generated using an automated training procedure such as a maximum likelihood procedure such as is referred to in the Ourston paper referenced above, while the specification of the hidden and visible states is specified by a human expert using an interface to the multi-stage event detector.

The determination(s) made by the transition determiner can be used in a number of different ways in order to improve the operation of the hidden state determiner (relative to the expected performance of the hidden state determiner if it were acting in isolation from the transition determiner).

For example, the determination(s) could be used as a verification/refutation step after the hidden state determiner has made a determination of a particular estimated sequence of hidden states (or perhaps just a verification or refutation of an estimation by the hidden state determiner of the current likely (hidden) state of the system—i.e. if the hidden state determiner, using, for example, an HMM, determines that it is most likely that the system has transitioned from Stage 1 to Stage 2, if the transition determiner additionally identifies a likely transition to have occurred to Stage 2 (e.g. if it identifies a pattern emerging from the outputs of the parameter generating detector units which gives a reasonably high probability of matching to a Stage 1 to Stage 2 transition)—this matching of the evaluations of the transition determiner and the hidden state determiner would cause the decision made by the HMM (of the hidden state determiner) to have been verified, otherwise we conclude that no such transition has in fact yet occurred, despite the assessment made by the HMM.

In a second example, the determinations made by the transition determiner could be used as a means of helping the multi-stage event detector to predict a possible future hidden state or to distinguish between different multi-stage events based only on a partial sequence of the hidden states (especially where different events share initial state sequences and are only distinguished in terms of hidden state sequences by later parts of the sequence (e.g. if a first multi-stage event follows the sequence Stage_1, Stage_2, Stage_3 and a second multi-stage event follows the sequence Stage_1, Stage_2, Stage_4 then whilst the multi-stage event detector has not yet seen evidence that the system has moved into either Stage_3 or Stage_4 of the multi-stage event it is difficult to decide if it is witnessing a first or a second multi-stage event). For example, it may be that the system includes a first pre-specified function associated with a first transition from Stage_1 to Stage_2 in accordance with the first multi-stage event and a second pre-specified function associated with a second transition also from Stage_1 to Stage_2 but in a different manner to that of the first pre-specified function and being instead associated with the second multi-stage event rather than the first multi-stage event. In such a case, if the transition determiner determines that it has found evidence of a transition matching the second pre-specified function much more closely than the first pre-specified function, the multi-stage event detector could determine that it is most likely that it is witnessing a second multi-stage event rather than a first multi-stage event. Preferably the transition determiner determines at least a confidence value specifying a degree of confidence with which it has determined the occurrence of a transition matching a pre-specified transition function. It may use a technique such as linear regression in order to generate a score of how well fitting a set of generated values of a parameter generated by one or more of the parameter generating detector units is to one or more of a plurality of pre-specified functions associated with one or more pre-specified types of transition. Where the output of the transition determiner is a set of confidence values indicating a degree of matching of a set of parameter values to a pre-specified transition type, in some embodiments, such confidence values may be combined with transition probabilities forming part of the model used by the hidden state determiner, for example by multiplying them together (possibly after applying a weighting to one or other or both of the confidence value and the transition probability) and then normalising (e.g. continuing with the example given above, if the transition determiner generates a confidence value of 0.8 of having seen a transition matching the second pre-specified function and a confidence value of 0.1 of having seen a transition matching the first pre-specified function, and if the hidden state determiner is using an HMM which includes a transition probability of transitioning form a Stage_2 state to a Stage_3 state of 0.5 and a transition probability of transitioning from a Stage_2 state to a Stage_4 state of 0.3 the multi-stage event detector could combine these to decide that it is most likely to be viewing a second type of multi-stage event (with sequence Stage_1, Stage_2, Stage_4) rather than a first type of multi-stage event because 0.8*0.3>0.1*0.5 since 0.24>0.05).

In a third example, the determinations made by the transition determiner could be used to modify certain parameters used in a model used by the hidden state determiner. For example, a determination by the transition determiner that it has matched a series of parameter values generated by a parameter generating detector unit to one of a plurality of pre-specified functions (e.g. by assigning to the match a confidence value exceeding some threshold value) could result in an HMM model used by the hidden state determiner having certain of its probability values modified and then running (or re-running) the HMM model against the outputs of the event detecting detector units using the modified probabilities. For example a determination by the transition determiner that it has observed a second transition type (as per example above corresponding to a transition from Stage_1 to Stage_2 as part of a multi-stage event involving the sequence Stage_1, Stage_2, Stage_4) could result in the transition probabilities of transitioning from a Stage_1 state to a Stage_2 state and/or from a Stage_2 state to a Stage_4 state to increase (in the latter case preferably at the expense of the Stage_2 state to Stage_3 state transition probability) and/or other probabilities could be modified such as the probability of a particular visible state or states being produced by either or both of a Stage_2 state and/or a Stage_4 state, etc.

In a fourth example of how the determinations made by the transition determiner could be used to influence the behaviour of the multi-stage event detector, a pure hidden model approach could be adopted in which transitions are modeled as separate states in their own right, and the output of the transition determiner is used as a visible state determiner which is combined with the outputs of the event detecting detector units to generate overall visible states which are then used by the hidden state determiner to generate an estimated sequence of hidden states which include stages of a multi-stage event and transitions between stages of a multi-stage event. In such a case, the operations of the parameter generating detector units and the transition determiner can be considered as pre-processing steps carried out before the final operation of the hidden state determiner. In order to distinguish embodiments in which the transition determiner is used in this way (corresponding to this fourth example) from embodiments using the transition determiner in a manner more like that of the first three examples above, the former such embodiments may be termed pure hidden state model embodiments whilst the latter may be referred to as mixed model embodiments (since a hidden state model such as an HMM is used in combination with a transition determining model rather than just using the transition determiner as a pre-processing part of the hidden state model).

Preferably, the Multi-stage event detector is used to detect multi-stage computer network attacks. Embodiments of the present invention as discussed above are particularly suited to defecting multi-stage computer network attacks (e.g. cyber attacks) because they can cope well with very drawn out attacks with long and varying transitions between stages. Moreover they can use a relatively simple and therefore robust and still accurate hidden state model with relatively few hidden states by aligning the hidden states with the stages of a multi-stage event. This makes the operation and outputs of the detector easier for a human user to understand which is an important factor in machine learning systems generally and is especially helpful in certain embodiments because of the use which they make of a human expert user to input conditions to be associated with certain multi-stage events (e.g. certain types of cyber attack).

In some embodiments, the transition determiner can be used to help divide a period of time into stages of a multi-stage event and transitions between stages. In embodiments therefore the multi-stage event detector outputs a representation of a period of time as constituting a series of stages of a multi-stage event and transitions between stages and associates each of these with a period of time for subsequent analysis by a user of the detector.

According to a second aspect of the present invention, there is provided a multi-stage event detector comprising a process generator operable to generate main and sub-processes, each main and sub-process being operable to generate and initiate one or more detection agents each of which is operable to be triggered by detecting the occurrence of a trigger event or series of events and to report back to its generating process or sub-process upon being so triggered, and wherein each process or sub-process is operable to respond to receipt of a report from a triggered detection agent by either reporting the detection of a multi-stage event or part thereof to either a parent process or sub-process or to an overall controller, or to generate and initiate a detection agent or a sub-process.

Preferably, the multi-stage event detector further comprises a store of conditions and a user interface by which a security expert user can input values to the store which are used to generate trigger event conditions used by the detection agents. Preferably, the detector permits a security expert user to manually define a multi-stage event scenario by describing its multiple stages and setting some measures/thresholds associated with each stage and each transition between stages.

Preferably the multi-stage event detector is operable to notify a user if it determines that a multi-stage event is occurring before the entirety of the event has occurred or has been detected.

Preferably the detector includes a pattern database storing many different patterns each associated with a different type of multi-stage event. Each pattern preferably comprises a unique sequence of stages (although more than one pattern may correspond to a single type of multi-stage event—e.g. a type of event categorised as a Distributed Denial of Service type of attack could be associated with more than one pattern).

Preferably the process generator generates a main process for each pattern stored in the pattern database. Preferably, the event detector is operable to distinguish between different multi-stage events of the same type occurring during overlapping periods of time but being distinguishable from one another by means of a distinguishing characteristic. In an embodiment, this is achieved in the following manner. When a detection agent instantiated by a main process is triggered as part of the trigger it identifies a distinguishing characteristic of the event; the trigger then causes the main process to instantiate a sub-process which generates a detection agent looking for a trigger indicating that the second stage of the pattern of the main process has been triggered, wherein the trigger condition includes an aspect which depends upon the distinguishing characteristic identified by the detection agent instantiated by the main process.

In some embodiments, each of the detection agents of the second aspect constitutes an event detecting detector unit of the first aspect. Furthermore, in some embodiments (some of which may coincide with some of the embodiments mentioned in the preceding sentence) the trigger condition sought for by each detection agent generated by a sub-process is specified in dependence upon an output from a hidden state determiner such as a hidden state determiner forming part of the first aspect of the present invention. For example, a main process could be instantiated looking for a pattern corresponding to a stage sequence comprising Stage_1, Stage_2, Stage_4. An initial Stage_1 detection agent could be generated by the main process with a generic trigger condition set indicating that a multi-stage event has been commenced with a Stage_1 occurrence. Upon this detection agent being triggered by observing the trigger condition, it may report back to the main process a trigger message indicating at least a distinguishing characteristic (e.g. a target identity) and a visible state identifier which the main process can correlate with a visible state forming part of a hidden state model used by the main process. The main process then generates a sub-process which generates at least a Stage_2 detection agent. The trigger condition of the Stage_2 detection agent may include a need for the same distinguishing characteristic to be involved. It may also depend upon an assessment by a hidden state determiner as to the visible states which would cause the hidden state determiner to determine that the system had transitioned to a Stage_2 state. This would then result in a trigger which would inevitably result in the detector as a whole determining that the event being tracked had entered the Stage_2 state as desired.

In some embodiments, more than one detection agent may be instantiated even though they are associated with a single trigger condition. For example if a trigger condition depends upon observing one condition on one physical system and another condition on a different system, one agent may be instantiated to monitor the one system and another to monitor the other system.

Further aspects of the invention relate to methods corresponding to the first and second aspects of the present invention and to processor instructions for causing a computer to operate as a multi-stage event detector according to one of the first or second aspects of the present invention or for causing a computer or other processor controlled device or set of devices to carry out a method according to an aspect of the present invention. Further aspects relate to carriers, preferably non-transitory carriers, such as magnetic or optical storage disks or solid state memory devices, carrying such processor instructions.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
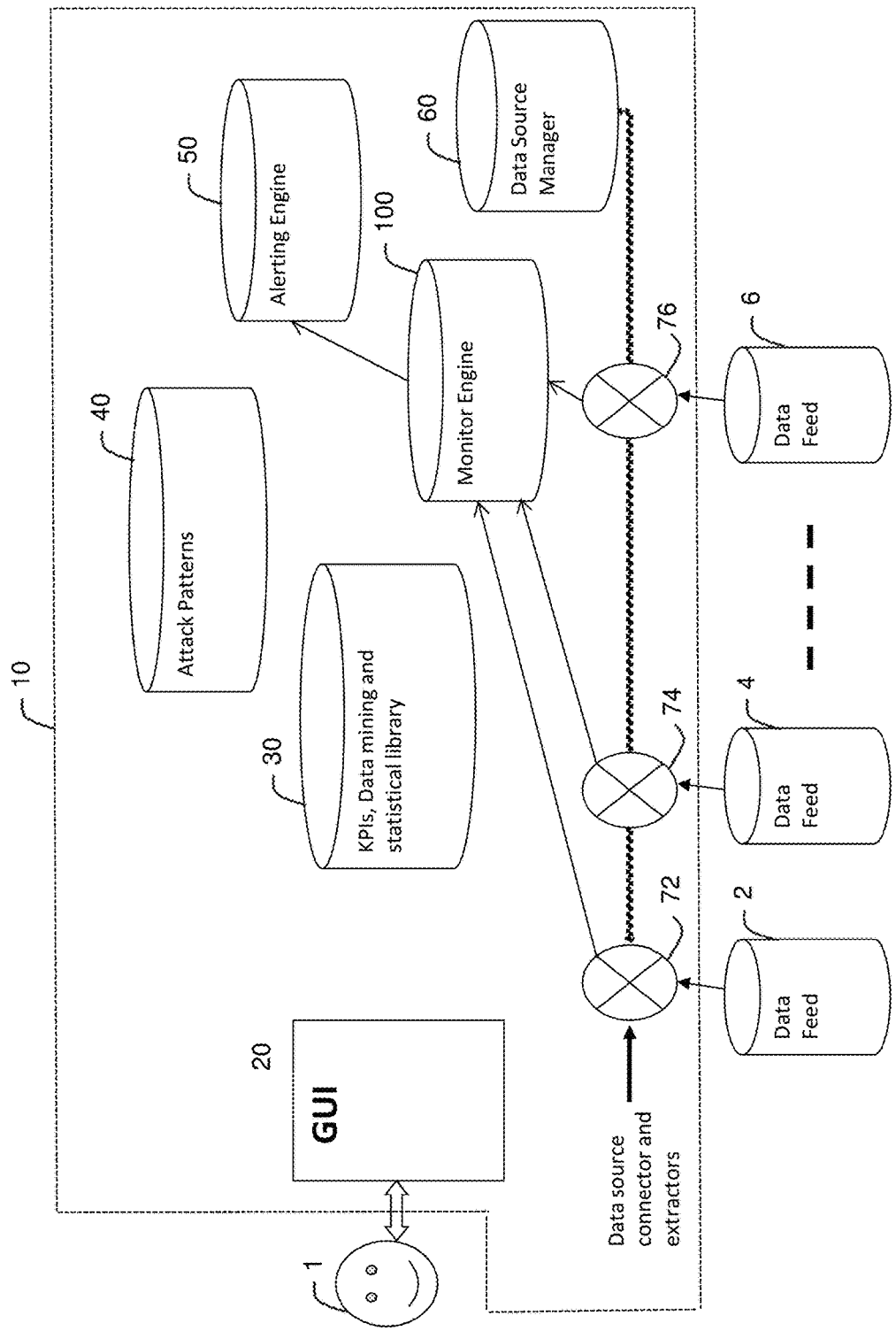
FIG. 1 is a schematic illustration of a computer network incorporating a multi-stage event detector according to an embodiment of the present invention.

FIG. 1 illustrates a computer network system including a multi-event detector according to several embodiments, where the embodiments differ only in terms of the structure and function of the monitor engine 100. First, second and third embodiments are discussed in greater detail below with reference to FIG. 2 (first embodiment), FIGS. 3, 4, 5 and 6 (second embodiment) and FIG. 7 (third embodiment).

As shown in FIG. 1, the system comprises a user 1, a series of data feeds 2, 4, 6 which are connected to the network being monitored or to alternative sources of information, and the multi-stage event monitor 10 (discussed in greater detail below).

The nature of the data feeds 2, 4, 6 is not especially pertinent to the present invention and so they will not be discussed herein in any great detail. But, for example, Data feed 2 could correspond to an engine for extracting information from the Internet, especially social network sites such as Twitter and Facebook, etc. as well as news sites and blogs, etc. Data feed 4 could correspond to a network based intrusion detection device monitoring one or more computer networks associated with one or more organizations which are being monitored by the monitor 10, and data feed 6 could correspond to an engine collecting data from host-based intrusion detection systems each of which is associated with an individual device belonging to a monitored organization, etc.

The monitor 10 comprises a Graphical User Interface component 20 for permitting a user to enter information into he monitor and for extracting information about detected events, etc. from the monitor. It also includes a Key Performance Indicator (KPI), Data mining and statistical library unit 30 which is used to assist a user in specifying certain observable events which may be used to help generate trigger conditions or visible or observable events which are ultimately used by the monitor engine 100 discussed in greater detail below. The monitor 10 additionally includes an attack patterns unit 40. This stores patterns of various pre-specified multi-stage events (such as certain cyber-attacks), especially in terms of typical sequences followed by such attacks (e.g. Stage_1, Stage_2, Stage_4). The monitor additionally includes an alerting engine which can cause alerts to be sent to interested users in a number of different ways (e.g. email, text message, flasing indicator on the GUI 20, etc.). The monitor 10 additionally includes a data source manager 60 and a number of data source connectors and extractors 72, 74, 76. The data source manager manages the data source connectors and extractors 72,74,76 which interface to the data feeds 2, 4, 6. Finally, the monitor additionally includes a monitor engine 100 discussed in greater detail below.

The KPIs, Data Mining and Statistical Library unit 30 stores KPIs which are measures or observable events from data sources and they are used in helping to try to ascertain whether a multi-stage event is occurring and if so what stage it has reached. In the present embodiment the user 1 creates various conditions (e.g. trigger conditions, transition functions, etc.) which depend upon certain KPI's which the data source connectors and extractors are able to extract from the data feeds, possibly after some pre-processing by one or more elements of the monitor 10 (including possibly the unit 30 itself). To support condition and transition function creation by the user 1, the unit 30 provides a list of existing KPIs such as packets/second, kbits/second, hits/hr, hits/data, events/min, etc. and how these can be modified (e.g. packets/second to or from a particular network address or range of addresses, etc). The user can also specify conditions based on these KPIs, for example upper and lower thresholds, gradients of parameter change during a specified duration, whether a gradient is increasing or decreasing, etc. The user can also specify where the information for a KPI should come from (e.g. from which data feed) for a particular condition and can form complex conditions based on logical combinations of multiple parameters, functions of parameters, sub-conditions, etc. All these are stored in the unit 30. Furthermore, while creating these measures, there are tools available to explore data sources to analyse historical data (e.g. generated during previous identified multi-stage events, etc. if such data concerning previous identified multi-stage events is available) through data mining and statistical tools also contained in the KPIs, Data Mining and Statistical Library unit 30.

The attack patterns unit permits a user to specify certain multi-stage events which he she would like the monitor 10 to be able to track and detect, etc. Each pattern includes the various stages which the multi-stage event is expected to proceed through. Once the patterns are created, they are stored in attack pattern database. There are versioning management. These patterns will be encoded in HMM for the monitoring engine to execute against data feeds. In addition to the stages created for each pattern, the attack patterns unit 40 also includes models (possibly using linear regression models or techniques applied to historical data) whose key properties can be specified by the user 1 in addition to specifying the sequence of stages through which a multi-stage event passes. For example a user could specify that a certain parameter might be expected to be increasing at a certain approximate rate between certain specified stages based on certain measures (e.g. the KPIs discussed above). These could be learned from historical data using any of many well-known techniques and tools (e.g. based on linear regression techniques) available or directly created by users.

Combining hidden state models (e.g. HMMs) focusing mostly on sequences of stages passed through in a multi-stage event and modeling of changes between such stages enables embodiments of the present invention to take advantage of temporal aspects of multi-stage events. This addresses three key issues associated with existing HMM applications to multi-stage event detection, especially detection of multi-stage network attacks. As mentioned above, there are some known applications of HMM's to multi-stage event detection techniques—most of them monitoring stages and signals for each stages. There are also works on using HMM to model stage transitions. However, all these have difficulties in monitoring the continuous progress of suspicious activities. Embodiments of the present invention provide a tool which allows human experts to create stage patterns and for each stage to specify what sources could be used for measuring events expected to occur when the event has reached a particular stage. Once these stages are created, the user can additionally specify functions of how certain parameters may be expected to vary between stages (e.g. the user can specify the shape of certain curves associated with a variable whose value typically changes between stages). These functions can model subtle changes between stages. These can then in turn be used to cope with numerous fuzzy measures of activities. Details of these functions (e.g. the direction of change of curves expressing parameter changes during transitions between stages) can better model more complexity in real situations in a manner which is easier for human experts to specify and so can better leverage a human user's expertise. To assist the human expert, these functions can be learned through automated or semi-automated machine learning techniques such as linear regression techniques based on data points between stages which the user 1 can specify (or retrieve from historical situations). This use of functions specifying how certain observable parameters may change during transitions between stages can also help to minimize the number of false positives generated by the monitor which is a constant problem with monitors of multi-stage and other kinds of complex events.

The data source connectors and extractors 72, 74, 76 handle data source related issues including connection and extraction of key fields. All these metadata are stored in the Data Source Manager 60. The data source manager maintains several tables. At least one of these tables includes data source id, data source name, and key field and method of data extraction for each data feed 2, 4, 6, etc. During general operation of the monitor 10, the data source connectors and extractors 72, 74, 76 extract information and send it to the monitor engine 100 which performs its monitoring in the manner described in greater detail below and generates notifications which are passed to the alerting engine 50 if it detects anything which it considers could be suspicious and therefore warranting generating a notification to the user 1.

Figure 2:
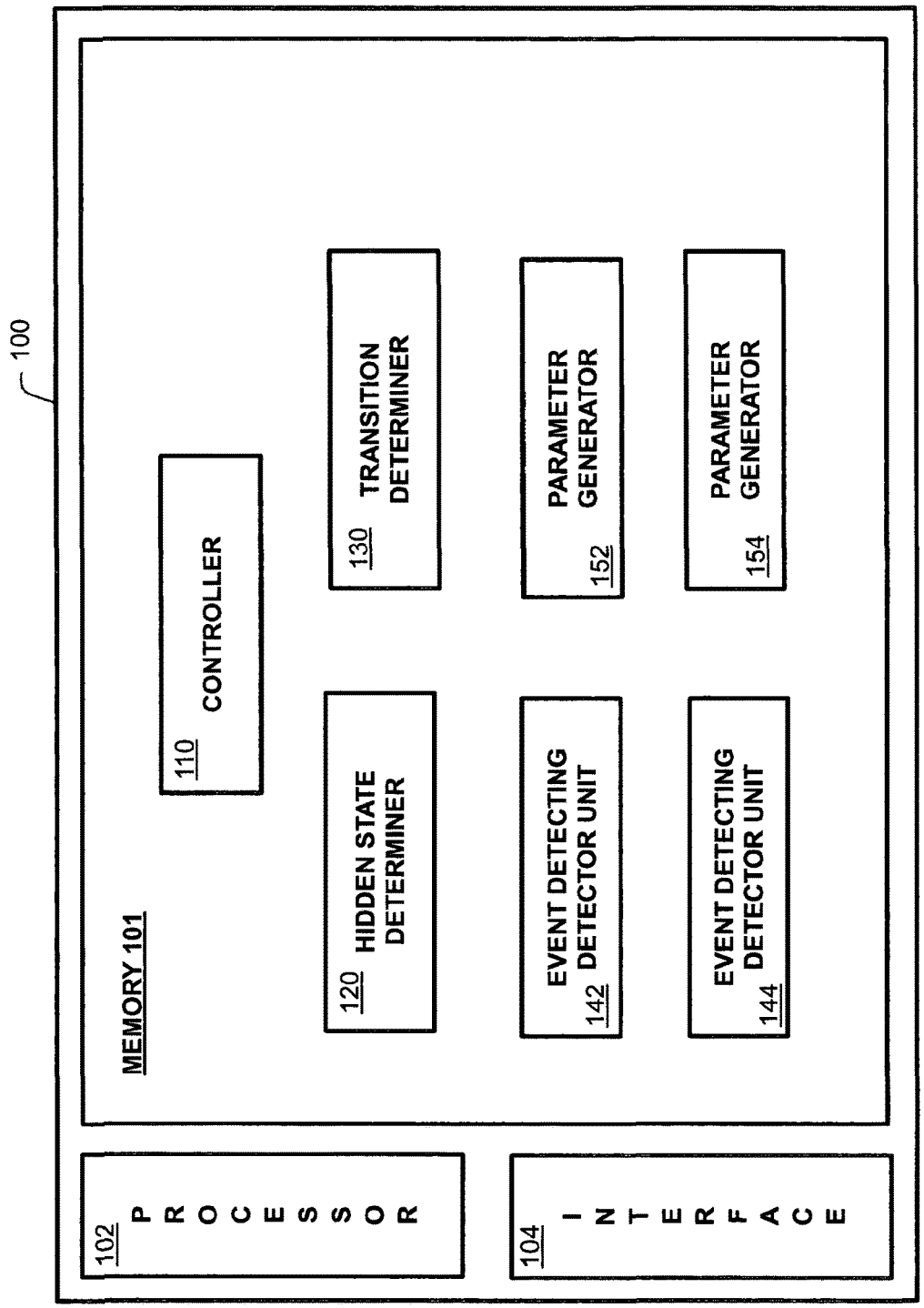
FIG. 2 is a schematic illustration of the monitoring engine of the multi-stage event detector of FIG. 1 shown in greater detail.

As mentioned above, the monitor engine varies in different embodiments. The monitor engine 100 of the first embodiment is illustrated in FIG. 2 in greater detail. This monitor engine primarily addresses issues of how to provide a relatively simple hidden state model which is used in conjunction with a transition determiner in order to provide accurate multi-event detection. The monitor engine 200 of the second embodiment (illustrated in FIG. 3) primarily addresses the issue of how to handle various different multi-stage events occurring in an overlapping manner by generating multiple separate processes to track individual events (or possible suspected events, etc.). Finally, the monitor engine 300 of the third embodiment illustrated in FIG. 7 combines the features of both the first and second embodiments to address all of these issues at the same time.

As shown in FIG. 2, the monitor engine 100 includes a memory 101, a processor unit 102 and an interface 104 permitting it to communicate with the other elements of the monitor 10. Stored within the memory are various sets of code which, when executed by the processor 102 cause associated functional modules to operate, with functions as described below with respect to each respective set of code. For the sake of convenience of explanation, both the code set and the associated functional module may be referred to interchangeably and using the same reference numerals below. The sets of code which are pertinent to the operation of the monitor engine in performing the functions relevant to certain example embodiments of the present invention are a controller code set 110 which is responsible for causing the monitor engine 100 to carry out overall control of the other functional modules of the monitor engine, a hidden state determiner code set 120 whose associated functional module manipulates a hidden state model in order to determine likely hidden state sequences for a corresponding sequence of visible state values, a transition determiner code set 130 whose associated functional module performs functions associated with comparing observed sequences of parameter values with pre-specified transition functions to look for likely matches, event detecting detector unit code sets 142, 144 whose corresponding functional modules co-operate with and process incoming data from the data source connectors and extractors 72, 74, 76 to generate visible events and or visible state values (under the control of the controller module 110) for use by the hidden state determiner 120, and parameter generator code sets 152, 154 whose functional modules also co-operate with and process incoming data from the data source connectors and extractors 72, 74, 76 to generate parameter values (under the control of the controller module 110) for use by the transition determiner 130.

As a whole, the monitor engine 100 is responsible for receiving data from the data feeds 2, 4, 6 and identifying the (inferred) occurrence of stages of a (single) multi-stage event. In overview, it achieves this by using a standard HMM as a hidden state model to determine an estimated sequence of stages through which a multi-stage event has progressed whilst using information from the transition determiner to assist in making a final determination as to what event (if any) is occurring and the likely consequences (if any) of such an event continuing to occur, and any steps that can be taken to mitigate against adverse effects of the event. Part way through a multi-stage event, the hidden state determiner 120 identifies a partial estimated sequence of stages through which the event is deemed to have passed thus far, and then (i.e. once a particular stage is deemed to have been reached) the monitor engine 100 selects all patterns which contain that partial estimated stage sequence (or possibly in alternative embodiments, all patterns which contain the current estimated stage) and then monitors the progress often certain pre-specified parameters whose values have been indicated as being relevant to a transition function pre-specified by a human user 1 and stored in the attack patterns unit 40 as discussed above.

It's worth noting that this is somewhat different from existing uses of HMMs for multistage attack detectors in which, for a given observable sequence $O1, O2, \ldots Ot$, it computes the probability of this sequence for each defined HMM and the highest probability of an HMM is claimed to be the intrusion. Without the complete sequence of observations associated with a complete multi-stage event such detectors are not good at detecting which multi-event attack is occurring. The present embodiment does not use the hidden state determiner in this way. Rather the monitor 10 receives continuous observations (streaming data feed), and calculates measures (or threshold values or parameter values, etc.), and then continues to compute these measures from streaming incoming data, and can determine changing states. It selects patterns (and thus suspected events—e.g. attack types) based on these states (which may be partial sequences only) as well as on transition information. It also continues this monitoring and assessing of stage sequences and transitions in order to be able to raise alerts at times (or stages) where it is deemed appropriate to raise alerts even before it is possible to ascertain exactly what event is occurring (which may only be possible after the event has completed which may be too late to mitigate successfully against the worst effects of the event).

When the monitor 10 starts to monitor for new events, it initially simply awaits some relevant results form the event detecting detector units. In the present embodiment, these look for events which the user 1 has specified are indications of an event of interest occurring. When, under the control of the controller 110, an event is observed which the controller determines gives rise to a change in the visible state of the system, the controller determines that an event may be occurring and records that the possible event is in an associated stage (e.g. Stage_1). The hidden state determiner can also be invoked at this point to determine a likely current hidden state (which corresponds to a stage of an event e.g. Stage_1—where a single stage may be associated with a number of different events including some harmless ones and some harmful ones), by processing the sequence of visible states according to the underlying hidden state model (which is a first order HMM in the present embodiment). The transition determiner may also be invoked at this stage to see if it can verify the possible occurrence of a transition from an initial no event occurring stage to the inferred current stage of the event. The output from the transition determiner can be used to refute the conclusion that an event is occurring or can indicate that a different stage has been reached or it can support the conclusion reached by the hidden state determiner. The controller combines the evidence from the two determiners 120 and 130 and then decides if a notification should be sent to the alerting engine (this would be the case if all possible events associated with the determined stage are harmful and (possibly) require mitigating action to be taken ideally). As additional evidence arrives form the data feeds as processed by the detector units 142, 144 and parameter generators 152, 154 these processes are repeated with the hidden state determiner being used to determine a new likely sequence of hidden states corresponding to a possible sequence of stages of the event, corroborated by the transition determiner. When a partial sequence of inferred stages of an event are consistent with multiple different types of event (especially if only certain of these are deemed to be strongly harmful) the transition determiner can be used to try to eliminate some of the possible types of event. If after such elimination only harmful possible events remain, the controller causes an appropriate notification to be sent to the alarm generating unit to cause an alert to be generated to a user identifying the suspected detected event occurring.

Figure 3:
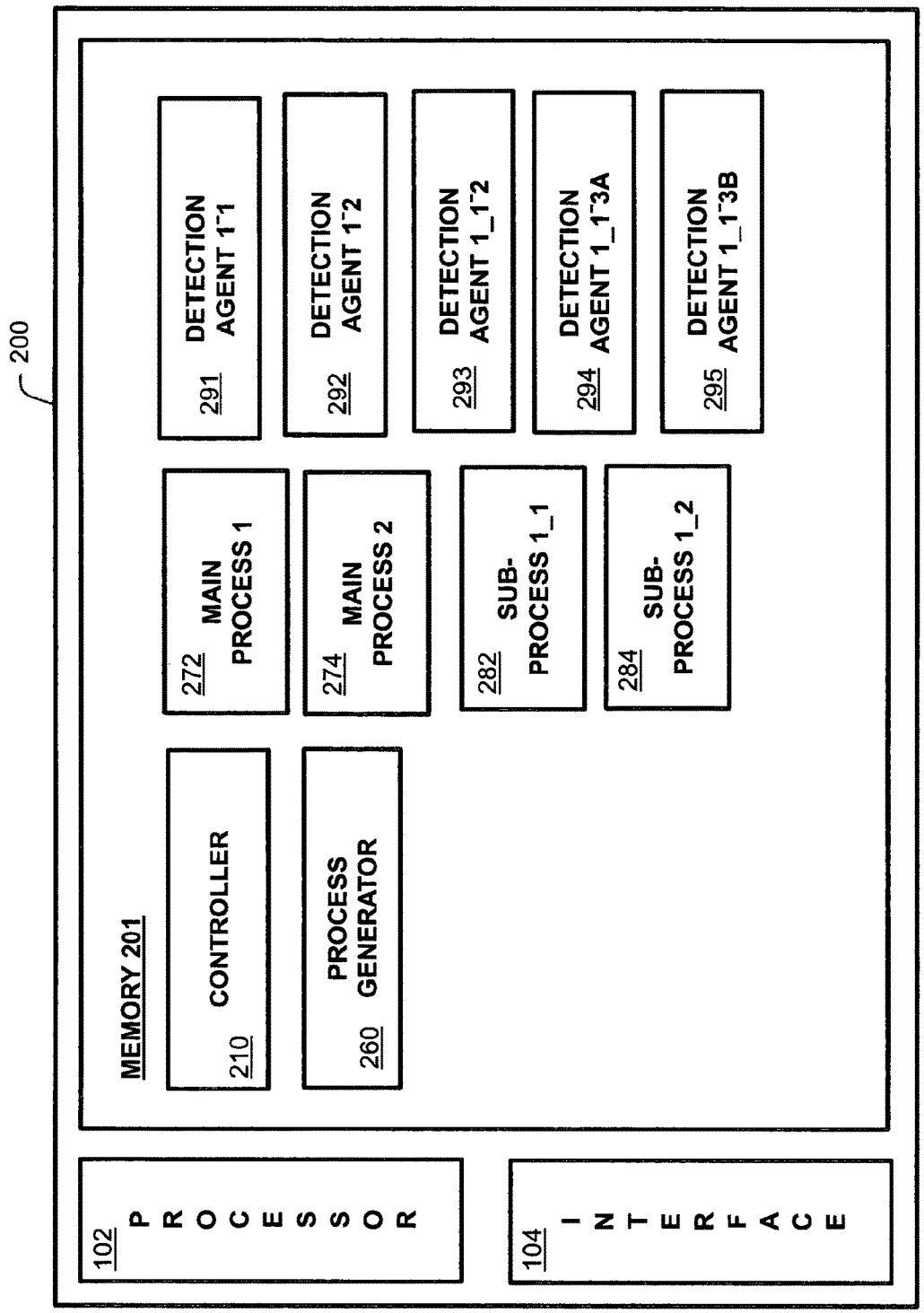
FIG. 3 is a schematic illustration of the monitoring engine of the multi-stage event detector of FIG. 1 according to a second embodiment.

Turning now to FIGS. 3-6, in a second embodiment, in place of the monitor engine 100 of the first embodiment, an alternative monitor engine 200 according to a second embodiment of the present invention is used in the monitor 10. As shown in FIG. 3, the monitor engine 200 comprises in its modified memory 201 a controller code set 210 and a process generator code set 260. Each of these gives rise to a corresponding functional module 210, 260 whose functionality is discussed below. Also shown in FIG. 3 in the memory 201 are various processes and detection agents. These are running threads of execution which are generated either by the process generator or by one of the processes. The operation of such software techniques is well understood in the field of multi-threaded computing and will not be described in any detail here.

As mentioned above, the problem which this embodiment particularly addresses is how to manage the communications between the monitor 10 and the external systems (the data feeds 2, 4, 6) in order to retrieve the required "live" information about specific multi-stage events that have been identified by a "trigger" or triggers for different stages of a multi-stage event, such as an attack scenario, multiple patterns for which have been stored in the attack patterns unit 40 in such a way that different attacks can be separated out and monitored separately amongst overlapping events occurring and interfering with each other. For example, Stage 1 of a potential DDoS (Distributed Denial of Service) attack might be that specific keywords are being used by Twitter posters quite frequently (say 10 times within an hour). This information needs to be retrieved and examined from an appropriate tool, e.g. the data feed 2, which is monitoring the Twitter posts continuously.

Since it's expected that there will be a lot of patterns contained in the database, where each pattern may have different measures and triggers for its stages, a systematic approach is needed to gather live feeds from the corresponding external systems and to pursue the subsequent stages of the patterns. Note that a single pattern may also have multiple states or "paths" simultaneously, whereas each path may be in different stages. Furthermore, while there is a sequence of stages, it is also expected that some stages might be skipped.

Consider as an example a particular "DDoS attack" pattern: its Stage 1 is the detection of keywords in Twitter; its Stage 2 is the detection of very high inbound packet traffic (for specific IP address); and its Stage 3 is detection of TCP-state exhaustion traffic at a firewall. The first path of the pattern could be that based on the discussion in Twitter, a "Company A" is likely being targeted for an attack (Stage 1). The second path of the (same) pattern could be that another "Company B" is experiencing TCP-state exhaustion traffic at its firewall (Stage 3). Hence the different paths are caused by different attack victims (e.g. different networks) being identified when the pattern engine was evaluating the live feed from the external systems.

The solution to the above difficulty provided by the monitor engine 200 is to apply a software agents approach in order to handle the communications between the monitor 10 and external systems 2, 4, 6. There are different types of software agents (i.e. processes) that can be parameterized individually before they are activated/sent to retrieve the required information from different external systems.

Figure 4:
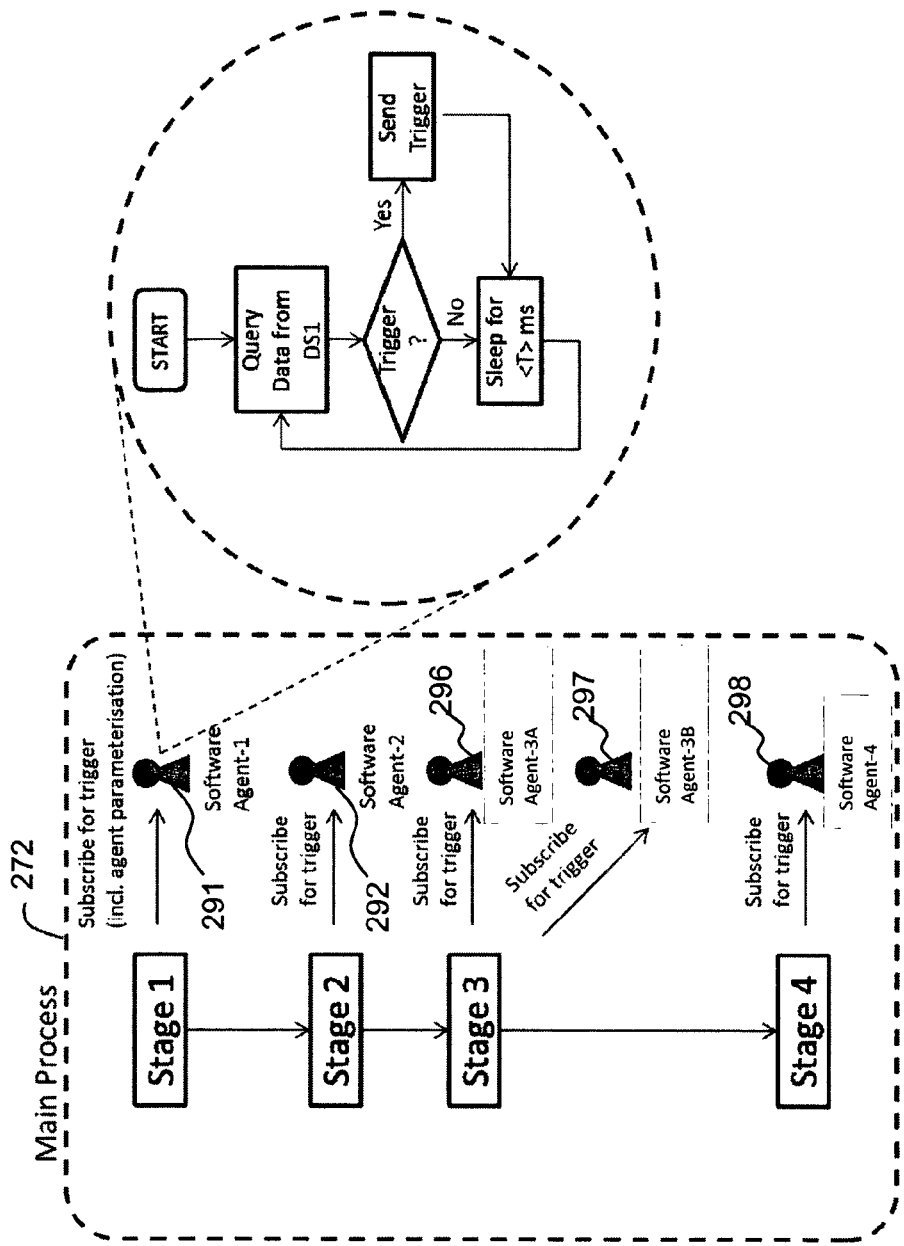
FIG. 4 is a schematic illustration of a main process generated by the monitoring agent of FIG. 3.
Figure 5:
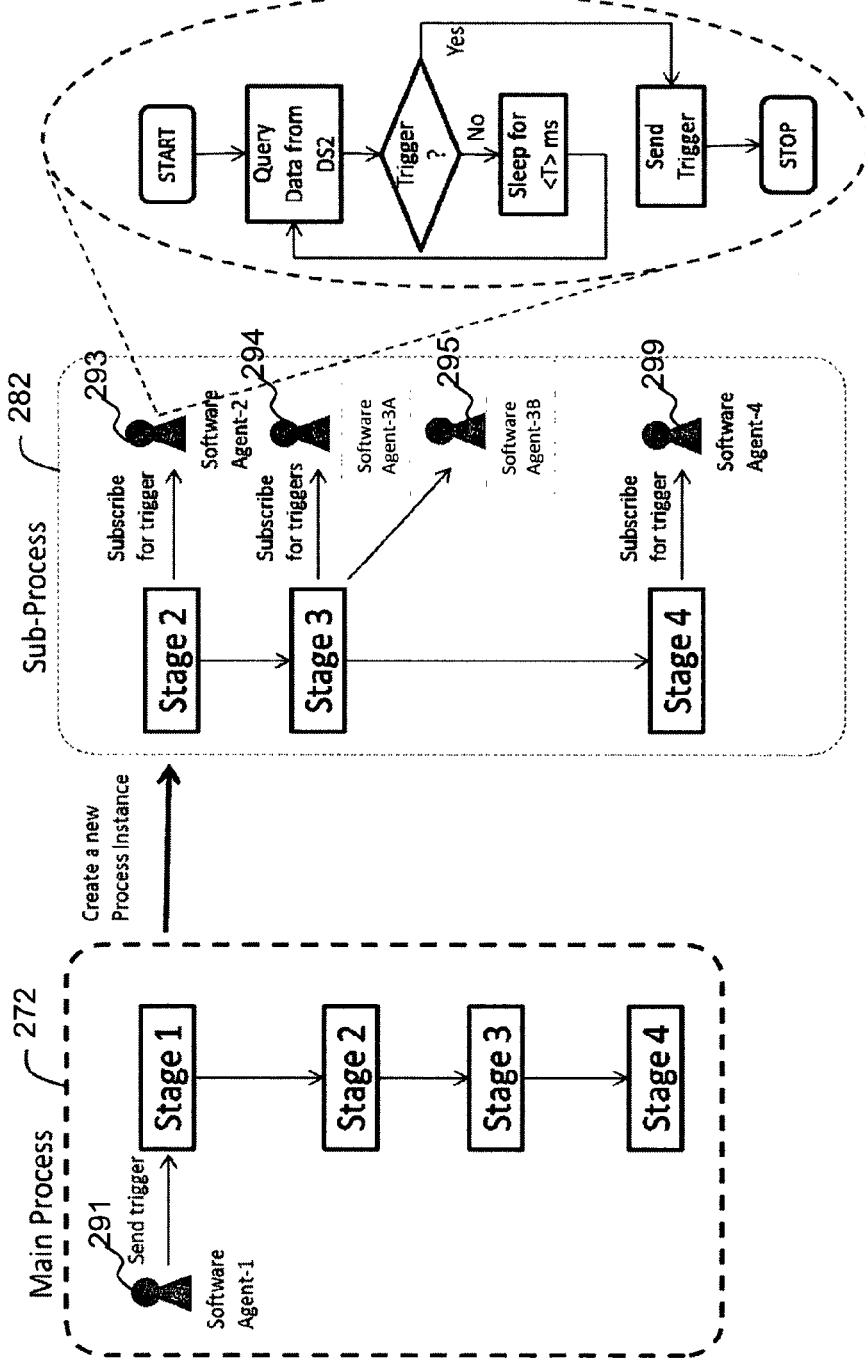
FIG. 5 is a schematic illustration of the main process of FIG. 4 and a sub-process generated by the main process as a result of receiving a trigger response from a detection agent associated with a stage 1 trigger condition.

At the beginning each pattern (instance) has a single running main process (e.g. Main Process 1 272 and Main Process 2 274) instantiated for it which is target agnostic (see FIGS. 3 and 4). Within this process 272, each stage instance of the pattern will have created and parameterized a software agent 291, 292, 296, 297, 298 (see FIG. 4) depending on what information the stage needs to allow it move on to the next stage (a trigger condition specified by a human user and stored in the attack patterns unit 40). As shown in FIG. 4, a stage (e.g. Stage 3) can also have more than one software agent (software agent 3A 296, and software agent 3B 297), since it's expecting trigger information coming from two different systems (e.g. from data feed 2 and data feed 4).

In the present embodiment, each stage is subscribing for a trigger signal coming from its software agent. The initial trigger conditions which are target agnostic are, in this embodiment, specified precisely by a human user (e.g. if more than a specified number of target terms connected with a monitored target organization are detected within a specified duration). Each software agent will have the capability to connect to the corresponding external system, query the data and examine it based on the trigger condition (e.g. thresholds) given by the stage instance. If the condition is satisfied the software agent will send a trigger signal to the stage/pattern instance. Otherwise it might sleep for certain time (e.g. <T> ms) and query and examine data again at a later time. Depending on whether a stage instance is completely relying on information (e.g. victim target) from the previous stage or not, any stage in the pattern can send/activate its software agent from the beginning, i.e. multiple active agents for a single pattern at one time.

Once the Stage 1 instance receives a trigger from its software agent, it creates a new sub-process of the pattern, which then contains the subsequent stages instances subscribing to their corresponding software agents (FIG. 4). This sub-process will form one "path" of the pattern to pursue further and will remain active until either it's reached the final stage or destroyed manually by human analysts or automatically after specific timeout. Timing information e.g. about the elapsed time between two trigger signals will be recorded by the pattern engine for enriching its predictive analytics capability. Each time after a sub-process is created, the main process of the pattern will remain active and keep expecting trigger signals from the software agents that might lead to creation of different paths of the pattern. A key point to note here is that the sub-process generates a trigger condition for any agents (e.g. software agent-2 293 generated by sub-process 282 illustrated in FIG. 5—and corresponding to detection agent 1_1.sup.-2 293 created by sub-process 1_1 282 of FIG. 3) which it instantiates which, although it is based on the generic target agnostic condition pre-specified by the user 1, is modified to be specific to a particular target organization (note however that this is merely one example way of distinguishing one event from another and there could be other distinguishing characteristics used in different embodiments), such that it will not be triggered by a similar condition being satisfied in respect of a different distinguished multi-stage event.

Figure 6:
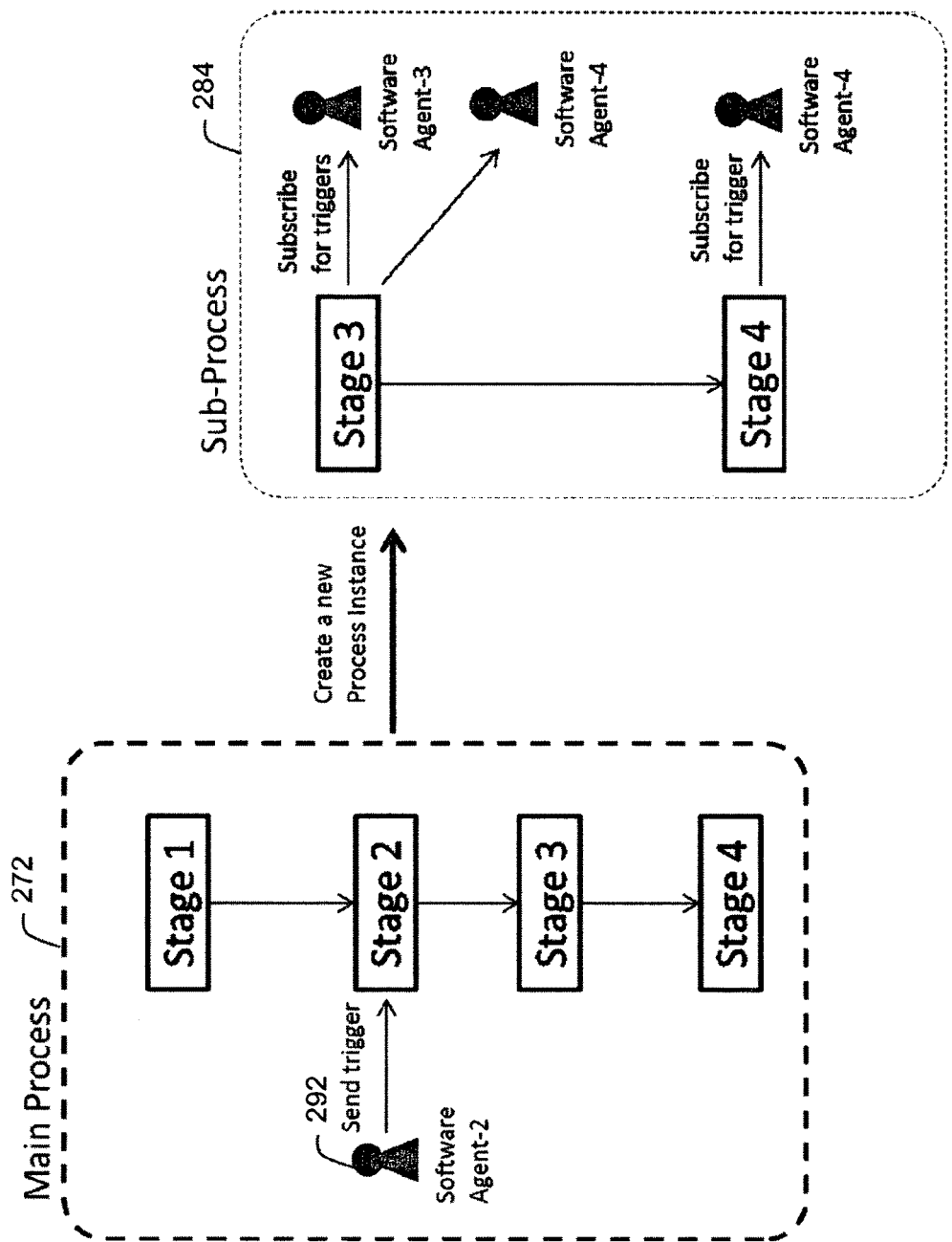
FIG. 6 is a schematic illustration of the main process of FIG. 4 and a second sub-process generated by the main process as a result of receiving a trigger response from a detection agent associated with a stage 2 trigger condition.

As mentioned before, it's possible that one or more stages will be skipped if the required trigger signal for the subsequent stage is received from a software agent. FIG. 6 shows the scenario where Stage 1 of the pattern has never received a trigger signal from its agent, but Stage 2 receives the signal from its agent and therefore creates a new sub-process with the remaining subsequent stages (specific to the target detected by the stage 2 agent of the main process).

Figure 7:
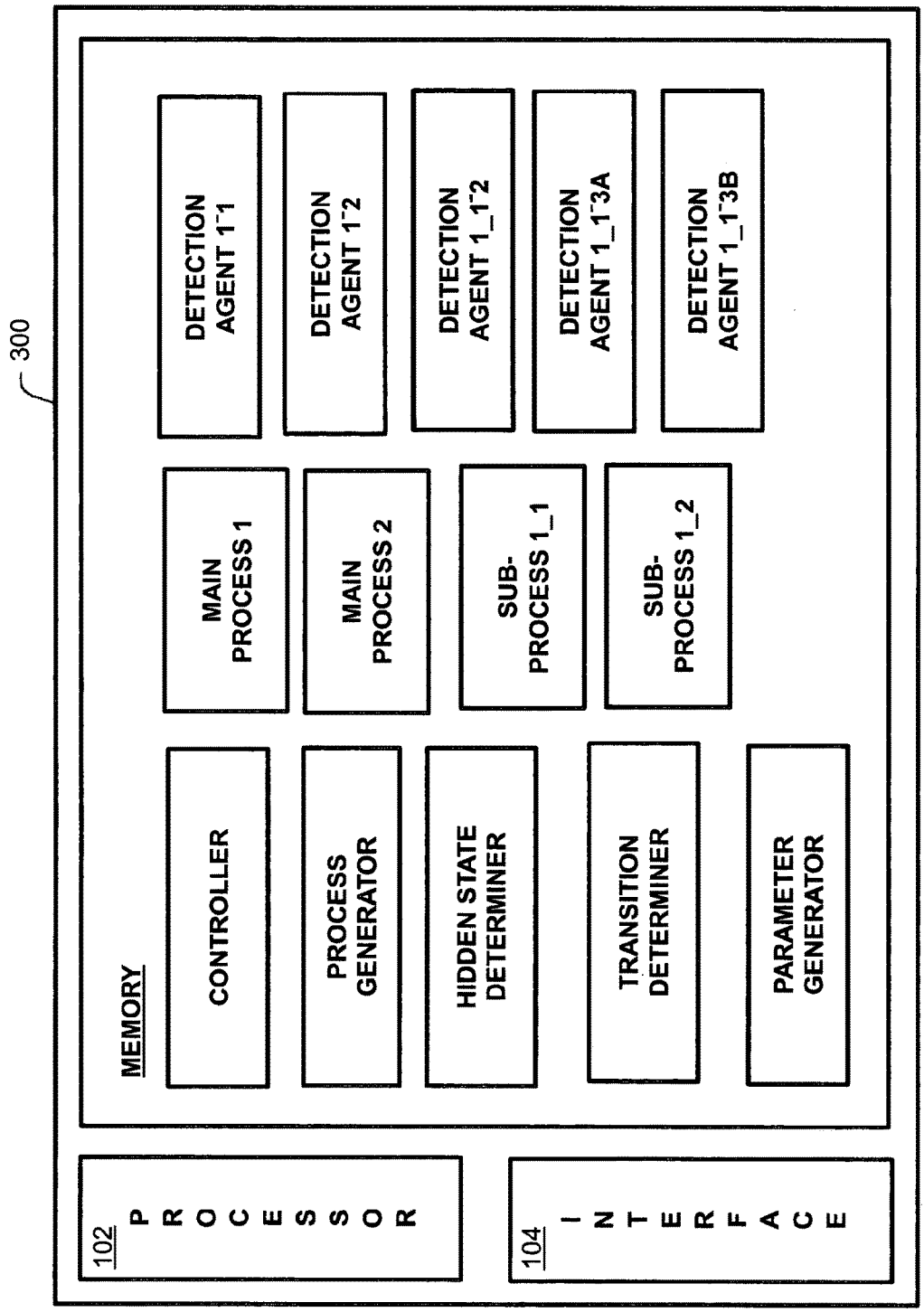
FIG. 7 is a schematic illustration of the monitoring engine of the multi-stage event detector of FIG. 1 according to a third embodiment.

The above described second embodiment does not use require the use of hidden state determiners or transition determiners and a simple implementation could rely solely on simple trigger conditions specified by user 1. However, the third embodiment combines the strengths of both of the first and second embodiments and is illustrated in FIG. 7. In general, the similarly named components operate in the same way as their respective counterparts do in the first and second embodiments and so will not be discussed again in detail. For present purposes it is sufficient to note that with such an embodiment, the trigger conditions associated with each software agent can be generated based on the outputs of the Hidden State and transition determiners in order to generate sophisticated trigger conditions which are developed dynamically using the power of the hidden state model and the transition model.

For example, as mentioned above on page 9, the trigger condition sought for by each detection agent generated by a sub-process may be specified in dependence upon an output from the hidden state determiner. For example, a main process could be instantiated looking for a pattern corresponding to a stage sequence comprising Stage_1, Stage_2, Stage_4. An initial Stage_1 detection agent could be generated by the main process with a generic trigger condition set indicating that a multi-stage event has been commenced with a Stage_1 occurrence. Upon this detection agent being triggered by observing the trigger condition, it may report back to the main process a trigger message indicating at least a distinguishing characteristic (e.g. a target identity) and a visible state identifier which the main process can correlate with a visible state forming part of a hidden state model used by the main process. The main process may then generate a sub-process which generates at least a Stage_2 detection agent. The trigger condition of the Stage_2 detection agent may include a need for the same distinguishing characteristic to be involved. It may also depend upon an assessment by the hidden state determiner as to the visible states which would cause the hidden state determiner to determine that the system had transitioned to a Stage_2 state. This would then result in a trigger which results in the detector as a whole determining that the event being tracked has entered the Stage_2 stage.

The invention claimed is:

1. A multi-stage event detector device, comprising:
   at least one processor and a memory operably coupled thereto, the at least one processor being configured to execute instructions stored in the memory to at least generate main and subprocesses, each main and sub-process being configured to generate and initiate one or more detection agents each of which is configured to be triggered by detecting the occurrence of a trigger event or series of events and to report back to its generating process or sub-process upon being so triggered, and
   wherein each generated process or sub-process is configured to respond to receipt of a report from a triggered detection agent by either (a) reporting a detection of a multi-stage event or part thereof to either a parent process or sub-process or to an overall software control module, or (b) generating and initiating a second detection agent or a second subprocess, wherein the generated process or sub-process that generated and initiated the second agent or second sub-process remains active, and
   wherein different processes and sub-processes are configured to operate in parallel.

2. The multi-stage event detector device according to claim 1, further comprising:
   a store comprising conditions; and
   a user interface configured to enable a security expert user to input to the store values that are used to trigger event conditions used by the detection agents.

3. The multi-stage event detector device according to claim 1, wherein the at least one processor is further configured to determine whether a multi-stage event is occurring before the entirety of the event has occurred or has been detected and, responsive to such a determination, notify a user.

4. The multi-stage event detector device according to claim 1, wherein when a detection agent instantiated by a main process is triggered, as part of the trigger it identifies a distinguishing characteristic of the event and the trigger then causes the main process to instantiate a sub-process that generates a detection agent looking for a trigger indicating that a second stage of the pattern of the main process has been triggered, wherein the trigger condition includes an aspect that depends upon the distinguishing characteristic identified by the detection agent instantiated by the main process, to cause the multi-stage event detector device to be configured to distinguish between different multi-stage events of the same type occurring during overlapping periods of time but being distinguishable from one another by means of a distinguishing characteristic.

5. The multi-stage event detector device according to claim 1, wherein each generated process and sub-process remains active until one of the following conditions occurs: a final stage is reached, the respective generated process or sub-process is manually destroyed, and the respective generated process or sub-process is automatically destroyed by the multi-stage event detector device.

6. The multi-stage event detector device according to claim 1, wherein each generated process and sub-process remains active until one of the following conditions occurs: a final stage is reached, the respective generated process or sub-process is manually destroyed, and the respective generated process or sub-process is automatically destroyed upon a timeout.

7. A method of detecting the occurrence of a multi-stage event within a system being monitored, the method comprising:
   generating, using processing resources including at least one processor and a memory, main and sub-processes, each main and sub-process being configured to generate and initiate one or more detection agents each of which is configured to be triggered by detecting the occurrence of a trigger event or series of events and to report back to its generating process or sub-process upon being so triggered, and wherein each process or sub-process is configured to respond to receipt of a report from a triggered detection agent by either (a) reporting the detection of a multi-stage event or part thereof to either a parent process or sub-process or to an overall software control module, or (b) generating and initiating a second detection agent or a second sub-process, wherein the generated process or sub-process that generated and initiated the second agent or second sub-process remains active; and
   detecting, using the processing resources, the occurrence of a multi-stage event in dependence upon the triggering of one or more detection agents, wherein different processes and sub-processes are configured to operate in parallel.

8. The method according to claim 7, further comprising storing to a data store input values, from a security expert user, that are used to trigger event conditions used by the detection agents.

9. The method according to claim 7, further comprising notifying a user in response to a determination that a multi-stage event is occurring before the entirety of the event has occurred or has been detected.

10. The method according to claim 7, wherein when a detection agent instantiated by a main process is triggered, as part of the trigger it identifies a distinguishing characteristic of the event and the trigger then causes the main process to instantiate a sub-process that generates a detection agent looking for a trigger indicating that a second stage of the pattern of the main process has been triggered, wherein the trigger condition includes an aspect that depends upon the distinguishing characteristic identified by the detection agent instantiated by the main process, in distinguishing between different multi-stage events of the same type occurring during overlapping periods of time but being distinguishable from one another by means of a distinguishing characteristic.

11. The method according to claim 7, wherein each generated process and sub-process remains active until one of the following conditions occurs: a final stage is reached, the respective generated process or sub-process is manually destroyed, and the respective generated process or sub-process is automatically destroyed by the multi-stage event detector device.

12. The method according to claim 7, wherein each generated process and sub-process remains active until one of the following conditions occurs: a final stage is reached, the respective generated process or sub-process is manually destroyed, and the respective generated process or sub-process is automatically destroyed upon a timeout.

13. A multi-stage event detector device, comprising:
at least one processor and a memory operably coupled thereto, the at least one processor being configured to execute instructions stored in the memory to at least generate main and subprocesses, each main and sub-process being configured to generate and initiate one or more detection agents, each being configured to be triggered by detecting the occurrence of a trigger event or series of events and to report back to its generating process or sub-process upon being so triggered;
wherein each generated process or sub-process is configured to perform both of, and selectively execute one of, responding to receipt of a report from a triggered detection agent by either (a) reporting a detection of a multi-stage event or part thereof to either (i) a parent process or sub-process or (ii) an overall software control module, and (b) generating and initiating a second detection agent or a second sub-process;
wherein the generated process or sub-process that generated and initiated the second agent or second sub-process remains active,
wherein at least one of the trigger events or series of events is associated with plural different attacks, and wherein different processes and sub-processes are configured to operate in parallel.

14. The multi-stage event detector device according to claim 13, further comprising a data store configured to store user-specified trigger event conditions received via a user interface.

15. The multi-stage event detector device according to claim 13, wherein the at least one processor is further configured to determine whether a multi-stage event is occurring before the entirety of the event has occurred or has been detected and, responsive to such a determination, notify a user.

16. The multi-stage event detector device according to claim 13, wherein the at least one processor is further configured to generate main and sub-processes which, in turn, are configured to generate and initiate one or more detection agents, each of which is further configured, when instantiated by a main process and subsequently triggered, to identify, as part of the trigger, a distinguishing characteristic of the event and then to cause the main process to instantiate a sub-process that generates a detection agent looking for a trigger indicating that a second stage of a pattern of the main process, which pattern comprises at least a first and a second stage, has been triggered, wherein the trigger condition includes an aspect that depends on the distinguishing characteristic identified by the detection agent instantiated by the main process, to cause the multi-stage event detector device to distinguish between different multi-stage events of the same type occurring during overlapping periods of time but being distinguishable from one another by means of a distinguishing characteristic.

17. The multi-stage event detector device according to claim 13, wherein each generated process and sub-process remains active until one of the following conditions occurs: a final stage is reached, the respective generated process or sub-process is manually destroyed, and the respective generated process or sub-process is automatically destroyed by the multi-stage event detector device.

18. The multi-stage event detector device according to claim 13, wherein each generated process and sub-process remains active until one of the following conditions occurs: a final stage is reached, the respective generated process or sub-process is manually destroyed, and the respective generated process or sub-process is automatically destroyed upon a timeout.

19. A non-transitory computer readable storage medium comprising instructions that, when executed by a processor of a computer, perform functionality comprising:
generating main and sub-processes, each main and sub-process being configured to generate and initiate one or more detection agents each of which is configured to be triggered by detecting the occurrence of a trigger event or series of events and to report back to its generating process or sub-process upon being so triggered, and wherein each process or sub-process is configured to respond to receipt of a report from a triggered detection agent by either (a) reporting the detection of a multi-stage event or part thereof to either a parent process or subprocess or to an overall software control module, or (b) generating and initiating a second detection agent or a second sub-process, wherein the generated process or sub-process that generated and initiated the second agent or second sub-process remains active; and
detecting the occurrence of a multi-stage event in dependence upon the triggering of one or more detection agents,
wherein different processes and sub-processes are configured to operate in parallel.

* * * * *